United States Patent
Liu et al.

(10) Patent No.: US 11,593,384 B2
(45) Date of Patent: Feb. 28, 2023

(54) PARKING LOT FREE PARKING SPACE PREDICTING METHOD, APPARATUS, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Hao Liu, Beijing (CN); Weijia Zhang, Beijing (CN); Hui Xiong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 298 days.

(21) Appl. No.: 17/021,979

(22) Filed: Sep. 15, 2020

(65) Prior Publication Data
US 2021/0232588 A1    Jul. 29, 2021

(30) Foreign Application Priority Data
Jan. 23, 2020    (CN) .......................... 202010076257.0

(51) Int. Cl.
| | | |
|---|---|---|
| G06F 16/00 | (2019.01) | |
| G06F 16/2457 | (2019.01) | |
| G06F 16/29 | (2019.01) | |
| G06N 3/08 | (2023.01) | |
| G08G 1/065 | (2006.01) | |

(52) U.S. Cl.
CPC ........ *G06F 16/24575* (2019.01); *G06F 16/29* (2019.01); *G06N 3/08* (2013.01); *G08G 1/065* (2013.01)

(58) Field of Classification Search
CPC ..... G06F 16/24575; G06F 16/29; G06N 3/08; G06N 3/0481; G06N 3/0445; G06N 3/0454; G08G 1/065; G08G 1/143; G08G 1/148; G06Q 10/04; G06Q 50/10
See application file for complete search history.

(56) References Cited

U.S. PATENT DOCUMENTS

2019/0172182 A1* 6/2019 Onzon .................... G06T 5/002

FOREIGN PATENT DOCUMENTS

CN    106960596    *    4/2017

OTHER PUBLICATIONS

Velickovic, et al. Graph Attention Networks, Feb. 4, 2018, ICLR, pp. 1-12.*

* cited by examiner

*Primary Examiner* — Dinku W Gebresenbet
(74) *Attorney, Agent, or Firm* — Ladas & Parry, LLP (57) ABSTRACT

A parking lot free parking space predicting method, apparatus, electronic device and storage medium are provided. The method comprises: building a parking lot association graph for parking lots in a region to be processed; aggregating environment context features of neighboring parking lots according to weights of edges between the neighboring parking lots and a parking lot i to obtain a representation vector of the parking lot i at a current time; and pre-training a graph attention neural network model using the environment context features of the neighboring parking lots and free parking space information, and a gated recurrent neural model according to the representation vector of the parking lot it at the current time.

15 Claims, 3 Drawing Sheets

Soft allocation matrix

PARKING LOT FREE PARKING SPACE PREDICTING METHOD, APPARATUS, ELECTRONIC DEVICE AND STORAGE MEDIUM

The present application claims the priority of Chinese Patent Application No. 202010076257.0, filed on Jan. 23, 2020, with the title of "Parking lot free parking space predicting method, apparatus, electronic device and storage medium". The disclosure of the above application is incorporated herein by reference in its entirety.

FIELD OF THE DISCLOSURE

The present disclosure relates to computer application technologies, and particularly to a parking lot free parking space predicting method, apparatus, electronic device and storage medium in the field of artificial intelligence.

BACKGROUND OF THE DISCLOSURE

When drivers need to park vehicles, they usually want to know which nearby parking lots can provide free parking spaces in near future, and correspondingly, if free parking space information of parking lots can be predicted, the drivers' parking efficiency can be improved effectively.

At present, annotation data may be generated based on a user's feedback, thereby predicting a degree of difficulty in parking vehicles in a certain region. However, the annotation data obtained in this manner might be inaccurate, for example, the user himself does not have precise metrics of the degree of parking difficulty and provides a coarse evaluation only by virtue of his own feeling. Furthermore, some misoperations of the user might occur and affect the feedback accuracy. The prediction results are very inaccurate on account of these problems.

SUMMARY OF THE DISCLOSURE

In view of the above, the present application provides a parking lot free parking space predicting method, apparatus, electronic device and storage medium.

A parking lot free parking space predicting method, comprising:
building a parking lot association graph for parking lots in a region to be processed, each junction therein representing a parking lot, and connecting any two parking lots meeting a predetermined condition through edges;
processing as follows for any parking lot i:
determining local space correlation information of parking lot i at a current time according to environment context features of the parking lot i and neighboring parking lots which are in the parking lot association graph and connected to the parking lot i through edges;
determining global space correlation information of the parking lot i at the current time according to a soft allocation matrix built based on the local space correlation information of the parking lots at the current time;
determining time correlation information of the parking lot i at the current time according to the local space correlation information and global space correlation information, and predicting free parking space information of the parking lot i at at least one future time step according to the time correlation information of the parking lot i at the current time.

According to a preferred embodiment of the present disclosure, the connecting any two parking lots meeting a predetermined condition through edges comprises: connecting any two parking lots with a distance less than or equal to a predetermined threshold through edges.

According to a preferred embodiment of the present disclosure, the determining local space correlation information of parking lot i at a current time comprises: determining local space correlation information of parking lot i at a current time based on a graph attention neutral network model;

the determining global space correlation information of the parking lot i at the current time according to a soft allocation matrix built based on the local space correlation information of the parking lots at the current time comprises: building the soft allocation matrix according to the local space correlation information of the parking lots at the current time based on a hierarchical graph neural network model, and determining the global space correlation information of the parking lot i at the current time according to the soft allocation matrix:

the determining time correlation information of the parking lot i at the current time and predicting free parking space information of the parking lot i at at least one future time step according to the time correlation information of the parking lot i at the current time comprises: determining time correlation information of the parking lot i at the current time based on a gated recurrent neural network model, and predicting the free parking space information of the parking lot i at at least one future time step according to the time correlation information of the parking lot i at the current time.

According to a preferred embodiment of the present disclosure, determining local space correlation information of parking lot i at a current time based on a graph attention neutral network model comprises:

as for neighboring parking lots, determining weights of edges between the neighboring parking lots and the parking lot i at the current time according to the environment context features of the neighboring parking lots and parking lot i at the current time, respectively;

aggregating the environment context features of the neighboring parking lots according to the weights of edges between the neighboring parking lots and the parking lot i to obtain a representation vector of the parking lot i, and regarding the representation vector as the local space correlation information of the parking lot i at the current time.

According to a preferred embodiment of the present disclosure, a weight $\alpha_{ij}$ of the edge between any neighboring parking lot j and parking lot i is represented as $$\alpha_{ij} = \frac{\exp(c_{ij})}{\sum_{k \in N_i} \exp(c_{ik})};$$

where $c_{ij}$=Attention($W_a x_i, W_a x_j$); Attention represents a graph attention mechanism; $N_i$ represents the number of neighboring parking lots; $x_i$ represents the environment context feature of the parking lot i at the current time; $x_j$ represents the environment context feature of neighboring parking lot j at the current time; $W_a$ represents a model parameter obtained by pre-training.

According to a preferred embodiment of the present disclosure, the representation vector $x_i' = \sigma(\Sigma_{j \in N_i} \alpha_{ij} W_a x_j)$;

where $N_i$ represents the number of neighboring parking lots; $x_j$ represents the environment context feature of any neighboring parking lot j among $N_i$ neighboring parking lots at the current time; $\alpha_{ij}$ represents a weight of the edge between the neighboring parking lot j and parking lot i at the current time; $W_a$ represents a model parameter obtained by pre-training; $\sigma$ represents an activation function.

According to a preferred embodiment of the present disclosure, the building the soft allocation matrix according to the local space correlation information of the parking lots at the current time, and determining the global space correlation information of the parking lot i at the current time according to the soft allocation matrix comprises:

generating a N-row and K-column soft allocation matrix according to the local space correlation information of the parking lots at the current time, wherein the N is equal to the number of parking lots in the parking lot association graph, the K is equal to a preset number of potential junctions, each row in the soft allocation matrix corresponds to one parking lot, each column in the soft allocation matrix corresponds to a potential junction, each element in each row of the soft allocation matrix represents a probability that a corresponding parking lot belongs to a corresponding potential junction;

according to the soft allocation matrix, determining representation vectors of the potential junctions respectively, and determining the weights of edges between the potential junctions respectively, and connecting any two potential junctions through edges;

determining final representation vectors of the potential junctions according to the representation vectors of the potential junctions and the weights of edges between the potential junctions;

determining, as for the parking lot i, the global space correlation information of parking lot i at the current time according to the final representation vectors of the potential junctions and the soft allocation matrix.

According to a preferred embodiment of the present disclosure, the method further comprises: obtaining elements in the $i^{th}$ row in the soft allocation matrix by calculating Softmax($W_s x_i'$), the $i^{th}$ row representing any row in the soft allocation matrix, $x_i'$ representing the local space correlation information of the parking lot corresponding to the $i^{th}$ row at the current time, and $W_s$ representing a model parameter obtained by pre-training.

According to a preferred embodiment of the present disclosure, the representation vector $x_i^s$ of any potential junction i in K potential junctions is expressed as $$x_i^s = \sum_{j=1}^{N} S_{ij}^T x_j';$$

where N represents the number of parking lots in the parking lot association graph; $x_j'$ represents the local space correlation information of any parking lot j in the N parking lots at the current time; S represents the soft allocation matrix.

According to a preferred embodiment of the present disclosure, the weight $\alpha_{ij}^s$ of the edge between any two potential junctions i and j in the K potential junctions is represented as $$\alpha_{ij}^s = \sum_{m=1}^{N} \sum_{n=1}^{N} S_{i,m}^T a_{mn} S_{n,j};$$

where N represents the number of parking lots in the parking lot association graph; S represents the soft allocation matrix; when any two parking lots m and n in the N parking lots are connected through an edge, $a_{mn}$ is a first predetermined value, otherwise it is a second predetermined value.

According to a preferred embodiment of the present disclosure, the final representation vector $x_i^{s'}$ of any potential junction i in the K potential junctions is represented as:

$x_i^{s'} = \sigma(\Sigma_{j \in Q_i} \alpha_{ij}^s W_l x_j^s)$;

where $Q_i$ represents the number of potential junctions connected with the potential junction i through edges; $x_j^s$ represents the representation vector of any potential junction j of $Q_i$ neighboring potential junctions; $W_l$ represents a model parameter obtained by pre-training; $\alpha_{ij}^s$ represents a weight of the edge between the potential junction i and potential junction j; $\sigma$ represents an activation function.

According to a preferred embodiment of the present disclosure, the global space correlation information $x_i^{sc}$ of the parking lot i at the current time is represented as $$x_i^{sc} = \sum_{j=1}^{K} S_{i,j} x_j^{s'};$$

where $x_j^{s'}$ represents the final representation vector of any potential junction j in the K potential junctions; S represents the soft allocation matrix.

According to a preferred embodiment of the present disclosure, before determining time correlation information of the parking lot i at the current time based on a gated recurrent neural network model, the method further comprises: concatenating the local space correlation information and global space correlation information of the parking lot i at the current time;

the determining time correlation information of the parking lot i at the current time based on a gated recurrent neural network model comprises: determining the time correlation information of the parking lot i at the current time according to the concatenation result and output of the gated recurrent neural network model at a previous time.

According to a preferred embodiment of the present disclosure, the time correlation information $h_i^t$ of the parking lot i at the current time is represented as $h_i^t=(1-z_i^t) \circ h_i^{t-1} + z_i^t \circ \tilde{h}_i^t$;

where $z_i^t = \sigma(W_z[h_i^{t-1}, x_i''] + b_z)$;

$\tilde{h}_i^t = \tanh(W_{\tilde{h}}[r_i^t \circ h_i^{t-1}, x_i''] + b_{\tilde{h}})$;

$r_i^t = \sigma(W_r[h_i^{t-1}, x_i''] + b_r)$;

$W_z$, $W_{\tilde{h}}$, $W_r$, $b_z$, $b_{\tilde{h}}$ and $b_r$ all are model parameters obtained by pre-training; $\sigma$ represents an activation function; $x_i''$ represents the concatenation result; $h_i^{t-1}$ represents the output of the gated recurrent neural network model at the previous time.

According to a preferred embodiment of the present disclosure, the predicting the free parking space information of the parking lot i at at least one future time step according to the time correlation information of the parking lot i at the current time comprises:

predicting the free parking space information of the parking lot i at future r time steps in the following manner: $(\hat{y}_i^{t+1}, \ldots, \hat{y}_i^{t+\tau}) = \sigma(W_o h_i^t)$;

where $\tau$ is a positive integer greater than one; $h_i^t$ represents the time correlation information of the parking lot i at the current time; $W_o$ represents a model parameter obtained by pre-training, σ represents an activation function; $\hat{y}_i^{t+1}$ represents the predicted free parking space information of the parking lot i at a first future time step; $\hat{y}_i^{t+\tau}$ represents the predicted free parking space information of the parking lot i at $\tau^{th}$ future time step.

According to a preferred embodiment of the present disclosure, the method further comprises:

when performing model training, selecting $N_l$ parking lots with real-time sensors as sample parking lots, building annotation data based on historical free parking space information of the sample parking lots, performing training optimization based on the annotation data, and minimizing an objective function O;

where the objective function $$O = \frac{1}{\tau N_l} \sum_{i=1}^{N_l} \sum_{j=1}^{\tau} (\hat{y}_i^{t+j} - y_i^{t+j})^2,$$

$N_l$ is a positive integer greater than 1, and $y_i^{t+j}$ represents real free parking space information of any sample parking lot i at a corresponding time step.

A parking lot free parking space predicting apparatus, comprising a building unit and a predicting unit;

the building unit is configured to build a parking lot association graph for parking lots in a region to be processed, each junction therein representing a parking lot, and connect any two parking lots meeting a predetermined condition through edges;

the predicting unit is configured to process as follows for any parking lot i: determine local space correlation information of parking lot i at a current time according to environment context features of the parking lot i and neighboring parking lots which are in the parking lot association graph and connected to the parking lot i through edges; determine global space correlation information of the parking lot i at the current time according to a soft allocation matrix built based on the local space correlation information of the parking lots at the current time; determine time correlation information of the parking lot i at the current time according to the local space correlation information and global space correlation information, and predict free parking space information of the parking lot i at at least one future time step according to the time correlation information of the parking lot i at the current time.

According to a preferred embodiment of the present disclosure, the building unit connects any two parking lots with a distance less than or equal to a predetermined threshold through edges.

According to a preferred embodiment of the present disclosure, the predicting unit determines local space correlation information of parking lot i at a current time based on a graph attention neutral network model;

the predicting unit builds the soft allocation matrix according to the local space correlation information of the parking lots at the current time based on a hierarchical graph neural network model, and determines the global space correlation information of the parking lot i at the current time according to the soft allocation matrix;

the predicting unit determines time correlation information of the parking lot i at the current time based on a gated recurrent neural network model, and predicts the free parking space information of the parking lot i at at least one future time step according to the time correlation information of the parking lot i at the current time.

According to a preferred embodiment of the present disclosure, the predicting unit, as for neighboring parking lots, determines weights of edges between the neighboring parking lots and the parking lot i at the current time according to the environment context features of the neighboring parking lots and parking lot i at the current time, respectively, aggregates the environment context features of the neighboring parking lots according to the weights of edges between the neighboring parking lots and the parking lot i to obtain a representation vector of the parking lot i, and regards the representation vector as the local space correlation information of the parking lot i at the current time.

According to a preferred embodiment of the present disclosure, a weight $\alpha_{ij}$ of the edge between any neighboring parking lot j and parking lot i $$\alpha_{ij} = \frac{\exp(c_{ij})}{\sum_{k \in N_i} \exp(c_{ik})};$$

where $c_{ij}$=Attention($W_a x_i, W_a x_j$); Attention represents a graph attention mechanism; $N_i$ represents the number of neighboring parking lots; $x_i$ represents the environment context feature of the parking lot i at the current time; $x_j$ represents the environment context feature of neighboring parking lot j at the current time; $W_a$ represents a model parameter obtained by pre-training.

According to a preferred embodiment of the present disclosure, the representation vector $x_i' = \sigma(\Sigma_{j \in N_i} \alpha_{ij} W_a x_j)$;

where $N_i$ represents the number of neighboring parking lots; $x_j$ represents the environment context feature of any neighboring parking lot j among $N_i$ neighboring parking lots at the current time; $\alpha_{ij}$ represents a weight of the edge between the neighboring parking lot j and parking lot i at the current time; $W_a$ represents a model parameter obtained by pre-training; σ represents an activation function.

According to a preferred embodiment of the present disclosure, the predicting unit generates a N-row and K-column soft allocation matrix according to the local space correlation information of the parking lots at the current time, wherein the N is equal to the number of parking lots in the parking lot association graph, the K is equal to a preset number of potential junctions, each row in the soft allocation matrix corresponds to one parking lot, each column in the soft allocation matrix corresponds to a potential junction, each element in each row of the soft allocation matrix represents a probability that a corresponding parking lot belongs to a corresponding potential junction; according to the soft allocation matrix, determines representation vectors of the potential junctions respectively, and determines the weights of edges between the potential junctions respectively, and connect any two potential junctions through edges; determines final representation vectors of the potential junctions according to the representation vectors of the potential junctions and the weights of edges between the potential junctions; determines, as for the parking lot i, the global space correlation information of parking lot i at the current time according to the final representation vectors of the potential junctions and the soft allocation matrix.

According to a preferred embodiment of the present disclosure, the predicting unit obtains elements in the $i^{th}$ row in the soft allocation matrix by calculating Softmax($W_s x_i'$), the $i^{th}$ row representing any row in the soft allocation matrix, $x_i'$ representing the local space correlation information of the parking lot corresponding to the $i^{th}$ row at the current time, and $W_s$ representing a model parameter obtained by pre-training.

According to a preferred embodiment of the present disclosure, the representation vector $x_i^s$ of any potential junction i in K potential junctions is expressed as $$x_i^s = \sum_{j=1}^{K} + S_{i,j}^T x_j';$$

where N represents the number of parking lots in the parking lot association graph; $x_j'$ represents the local space correlation information of any parking lot j in the N parking lots at the current time; S represents the soft allocation matrix.

According to a preferred embodiment of the present disclosure, the weight $\alpha_{ij}^s$ of the edge between any two potential junctions i and j in the K potential junctions is represented as $$\alpha_{ij}^s = \sum_{m=1}^{N} \sum_{n=1}^{N} S_{i,m}^T a_{mn} S_{n,j};$$

where N represents the number of parking lots in the parking lot association graph; S represents the soft allocation matrix; when any two parking lots m and n in the N parking lots are connected through an edge, $a_{mn}$ is a first predetermined value, otherwise it is a second predetermined value.

According to a preferred embodiment of the present disclosure, the final representation vector $x_i^{s'}$ of any potential junction i in the K potential junctions is represented as: $x_i^{s'} = \sigma(\Sigma_{j \in Q_i} \alpha_{ij}^s W_i x_j^s)$;

where $Q_i$ represents the number of potential junctions connected with the potential junction i through edges; $x_j^s$ represents the representation vector of any potential junction j of $Q_i$ neighboring potential junctions; $W_i$ represents a model parameter obtained by pre-training; $\alpha_{ij}^s$ represents a weight of the edge between the potential junction i and potential junction j; $\sigma$ represents an activation function.

According to a preferred embodiment of the present disclosure, the global space correlation information $x_i^{sc}$ of the parking lot i at the current time is represented as $$x_i^{sc} = \sum_{j=1}^{K} S_{i,j} x_j^{s'};$$

where $x_j^{s'}$ represents the final representation vector of any potential junction j in the K potential junctions; S represents the soft allocation matrix.

According to a preferred embodiment of the present disclosure, the predicting unit is further configured to concatenate the local space correlation information and global space correlation information of the parking lot i at the current time, and determine the time correlation information of the parking lot i at the current time according to the concatenation result and output of the gated recurrent neural network model at a previous time.

According to a preferred embodiment of the present disclosure, the time correlation information $h_i^t$ of the parking lot i at the current time is represented as $h_i^t = (1-z_i^t) \circ h_i^{t-1} + z_i^t \circ \tilde{h}_i^t$;

where $z_i^t = \sigma(W_z[h_i^{t-1}, x_i''] + b_z)$;

$\tilde{h}_i^t = \tanh(W_{\tilde{h}}[r_i^t \circ h_i^{t-1}, x_i''] + b_{\tilde{h}})$;

$r_i^t = \sigma(W_r[h_i^{t-1}, x_i''] + b_r)$;

$W_z$, $W_{\tilde{h}}$, $W_r$, $b_z$, $b_{\tilde{h}}$ and $b_r$ all are model parameters obtained by pre-training; $\sigma$ represents an activation function; $x_i''$ represents the concatenation result; $h_i^{t-1}$ represents the output of the gated recurrent neural network model at the previous time.

According to a preferred embodiment of the present disclosure, the predicting unit predicts the free parking space information of the parking lot i at future $\tau$ time steps in the following manner: $(\hat{y}_i^{t+1}, \ldots, \hat{y}_i^{t+\tau}) = \sigma(W_o h_i^t)$;

where $\tau$ is a positive integer greater than one; $h_i^t$ represents the time correlation information of the parking lot i at the current time; $W_o$ represents a model parameter obtained by pre-training, $\sigma$ represents an activation function; $\hat{y}_i^{t+1}$ represents the predicted free parking space information of the parking lot i at a first future time step; $\hat{y}_i^{t+\tau}$ represents the predicted free parking space information of the parking lot i at $\tau^{th}$ future time step.

According to a preferred embodiment of the present disclosure, the apparatus further comprises: a pre-processing unit configured to perform model training, where $N_l$ parking lots with real-time sensors are selected as sample parking lots, annotation data are built based on historical free parking space information of the sample parking lots, training optimization is performed based on the annotation data, and an objective function O is minimized;

where the objective function $$O = \frac{1}{\tau N_l} \sum_{i=1}^{N_l} \sum_{j=1}^{\tau} (\hat{y}_i^{t+j} - y_i^{t+j})^2,$$

$N_l$ is a positive integer greater than 1, and $y_i^{t+j}$ represents real free parking space information of any sample parking lot i at a corresponding time step.

An electronic device, comprising:
at least one processor; and
a memory communicatively connected with the at least one processor, wherein,
the memory stores instructions executable by the at least one processor, and the instructions are executed by the at least one processor to enable the at least one processor to perform the above method.

A non-transitory computer-readable storage medium storing computer instructions therein, wherein the computer instructions are used to cause the computer to perform the above method.

Embodiments of the present disclosure have the following advantages or advantageous effects: the local space correlation information, the global space correlation information and the time correlation information of the parking lots may be determined in conjunction with the environment context features of the parking lots, and future free parking space information of the parking lots may be predicted based on these information, thereby improving the accuracy of the prediction result; in addition, the local space correlation information, the global space correlation information and the time correlation information of the parking lots may be obtained by virtue of different network models, thereby enhancing the accuracy of the obtained results and further enhancing the accuracy of subsequent prediction results; furthermore, when the model is trained, annotation data may be built based on historical free parking space information of the parking lots with real-time sensors, and training optimization may be performed, thereby making the annotation data more accurate and thereby enhancing the model training effect. Other effects of the above optional manners will be described hereunder in conjunction with specific embodiments.

BRIEF DESCRIPTION OF DRAWINGS

The figures are intended to facilitate understanding the solutions, not to limit the present disclosure. In the figures.

DETAILED DESCRIPTION OF PREFERRED EMBODIMENTS

Exemplary embodiments of the present disclosure are described below with reference to the accompanying drawings, include various details of the embodiments of the present disclosure to facilitate understanding, and should be considered as merely exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

In addition, it should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
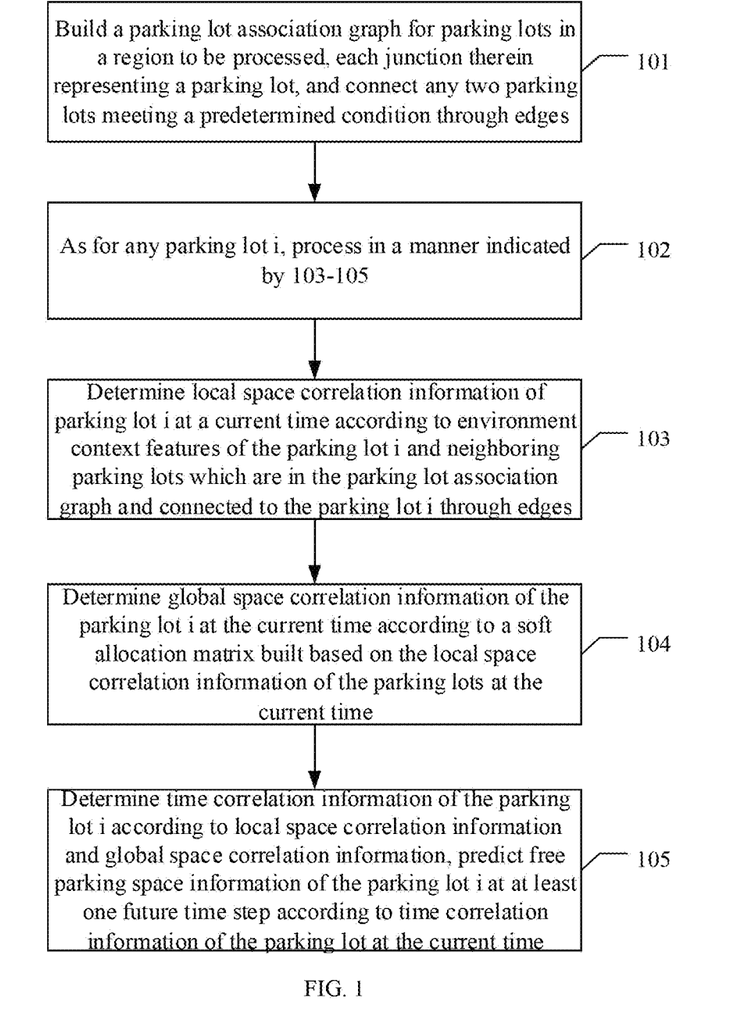
FIG. 1 illustrates a flow chart of an embodiment of a parking lot free parking space predicting method according to the present disclosure.

FIG. 1 illustrates a flow chart of an embodiment of a parking lot free parking space predicting method according to the present disclosure. As shown in FIG. 1, the embodiment comprises the following specific implementation mode.

At 101, a parking lot association graph is built for parking lots in a region to be processed, each junction therein representing a parking lot, and any two parking lots meeting a first predetermined condition are connected through edges.

At 102, any parking lot is processed in a manner shown in 103-105.

At 103, local space correlation information of parking lot i at a current time is determined according to environment context features of the parking lot i and neighboring parking lots which are in the parking lot association graph and connected to the parking lot i through edges.

At 104, global space correlation information of the parking lot i at the current time is determined according to a soft allocation matrix built based on the local space correlation information of the parking lots at the current time.

At 105, time correlation information of the parking lot i at the current time is determined according to the local space correlation information and global space correlation information, and free parking space information of the parking lot i at at least one future time step is predicted according to the time correlation information of the parking lot i at the current time.

Take Beijing as an example. There might be tens of thousands of parking lots in the whole city. However, since real-time sensors are costly, they are mounted in only very few parking lots to monitor in real time the current free parking space information which usually refers to the number of free parking spaces. Hence, it is very necessary to predict free parking space information of parking lots.

There are usually local space correlation and global space correlation between parking lots in a city. For example, when a user goes to a hot restaurant for a meal, if the parking lots of the restaurant are in high demand, he usually chooses to park his car in one of other surrounding parking lots, which reflects the local space correlation. Again for example, two working regions which are far away from each other might simultaneously be in a state in high demand for parking lots upon working time, whereas two leisure regions which are far away from each other might simultaneously be in a state with free parking spaces upon working time, which reflect the global space correlation.

In the present embodiment, the local space correlation and global space correlation of the parking lots may be modeled using a graph attention neural network model and a hierarchical graph neural network model to obtain a final space correlation representation of the parking lots, and the final space correlation representation is input to a gated recurrent neural network model to predict future free parking space information of the parking lots.

To depict the local space correlation, a parking lot association graph may be built for parking lots in a region to be processed (e.g., the city of Beijing), each junction in the parking lot association graph represents a parking lot, and any two parking lots meeting a predetermined condition are connected through edges. For example, any two parking lots with a distance less than or equal to a predetermined threshold are connected through edges, i.e., parking lots which are close to each other have a strong correlation.

Figure 2:
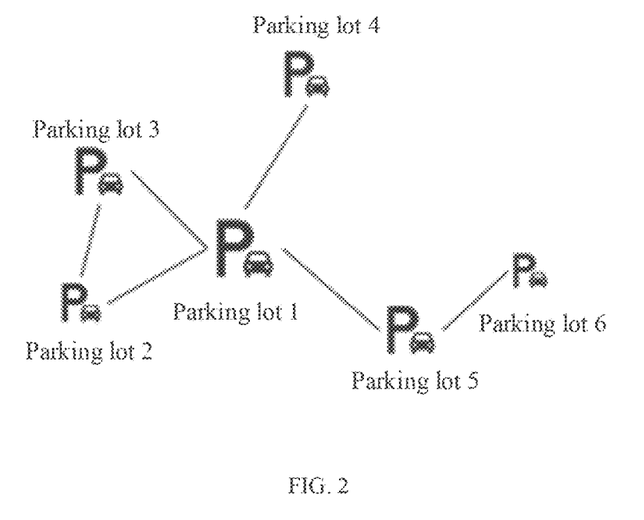
FIG. 2 illustrates a schematic diagram of a parking lot association graph according to the present disclosure.

FIG. 2 illustrates a schematic diagram of a parking lot association graph according to the present disclosure. A specific value of the threshold may depend on actual needs, for example, 1 km, and correspondingly, there is the following formula:

$$e_{ij} = \begin{cases} 1, & dits(v_i, v_j) \leq 1 \text{ km} \\ 0, & \text{otherwise} \end{cases} ; \quad (1)$$

That is, if a distance $dits(v_i, v_j)$ between any two parking lots is less than or equal to 1 km, the two parking lots are connected through edges, otherwise they are not connected. The distance usually refers to a road network distance.

As for any parking lot i, local space correlation information of parking lot i at a current time may be determined according to environment context features of the parking lot i and neighboring parking lots which are in the parking lot association graph and connected to the parking lot i through edges.

The environment context feature of the parking lots may include a peripheral population feature, a peripheral Points of Interest (POIs) distribution feature etc. The specific content included by the environment context features may depend on actual needs. The peripheral refers to a surrounding predetermined scope. The population feature may refer to the number of active users. For example, a user will upload positioning information upon using an app such as a map app, and the user's activity regions may be obtained by using the positioning information. The POI distribution feature may include the number and types of the POIs and so on. In practical application, the obtained environment context features may be represented in the form of vectors according to predetermined rules. The environment context features are dynamically variable.

As shown in FIG. 2, parking lot i is taken as an example. Parking lot 2, parking lot 3, parking lot 4 and parking lot 5 all are neighboring parking lots of parking lot i.

As for any parking lot i, neighboring parking lots of the parking lot i may be first determined, the neighboring parking lots being parking lots which are in the parking lot association graph and connected to the parking lot i through edges, and then local space correlation information of parking lot i at a current time may be determined according to environment context features of the neighboring parking lots and parking lot i at the current time.

Specifically, as for the neighboring parking lots, it is feasible to determine weights of edges between the neighboring parking lots and the parking lot i at the current time according to the environment context features of the neighboring parking lots and parking lot i at the current time, respectively; aggregate the environment context features of the neighboring parking lots according to the weights of edges between the neighboring parking lots and the parking lot i to obtain a representation vector of the parking lot i, and regard the representation vector as the local space correlation information of the parking lot i at the current time. Since the environment context features of the parking lots are dynamically variable, the above weights and representation vector are also dynamically variable.

Optionally, as for any neighboring parking lot j, a weight $\alpha_{ij}$ between it and the parking lot i may be:

$$\alpha_{ij} = \frac{\exp(c_{ij})}{\sum_{k \in N_i} \exp(c_{ik})}; \quad (2)$$

where $c_{ij}$=Attention($W_a x_i, W_a x_j$); (3)

Attention represents a graph attention mechanism; $N_i$ represents the number of neighboring parking lots of the parking lot i; $x_i$ represents the environment context feature of the parking lot i at the current time; $x_j$ represents the environment context feature of neighboring parking lot j at the current time; $W_a$ represents a model parameter obtained by pre-training.

The environment context features of the neighboring parking lots may be aggregated according to the weights of edges between the neighboring parking lots and the parking lot i to obtain the representation vector of the parking lot i. The representation vector $x_i'$ may be:

$$x_i' = \sigma(Z_{j \in N_i} \alpha_{ij} W_a x_j); \quad (4)$$

where $N_i$ represents the number of neighboring parking lots of the parking lot i; $x_j$ represents the environment context feature of any neighboring parking lot j among $N_i$ neighboring parking lots at the current time; $\alpha_{ij}$ represents a weight of the edge between the neighboring parking lot j and parking lot i at the current time; $W_a$ represents a model parameter obtained by pre-training; $\sigma$ represents an activation function.

In the above processing manner, the local space correlation information at the current time may be obtained respectively with respect to each parking lot.

As for the parking lot i, the global space correlation information of parking lot i at the current time may be determined according to a soft allocation matrix built based on the local space correlation information of the parking lots at the current time. Preferably, the soft allocation matrix may be built according to the local space correlation information of the parking lots at the current time based on the hierarchical graph neural network model, and the global space correlation information of parking lot i at the current time may be determined according to the soft allocation matrix.

Specifically, a N-row and K-column soft allocation matrix may be generated according to the local space correlation information of the parking lots at the current time, wherein N is equal to the number of parking lots in the parking lot association graph, K is equal to a preset number of potential junctions, each row in the soft allocation matrix corresponds to one parking lot, each column in the soft allocation matrix corresponds to a potential junction, each element in each row of the soft allocation matrix represents a probability that a corresponding parking lot belongs to a corresponding potential junction. According to the soft allocation matrix, representation vectors of the potential junctions may be determined respectively, the weights of edges between the potential junctions are determined respectively, and any two potential junctions are connected through edges. Then, final representation vectors of the potential junctions may be determined according to the representation vectors of the potential junctions and the weights of edges between the potential junctions. Furthermore, as for the parking lot i, the global space correlation information of parking lot i at the current time may be determined respectively according to the final representation vectors of the potential junctions and the soft allocation matrix.

Figure 3:
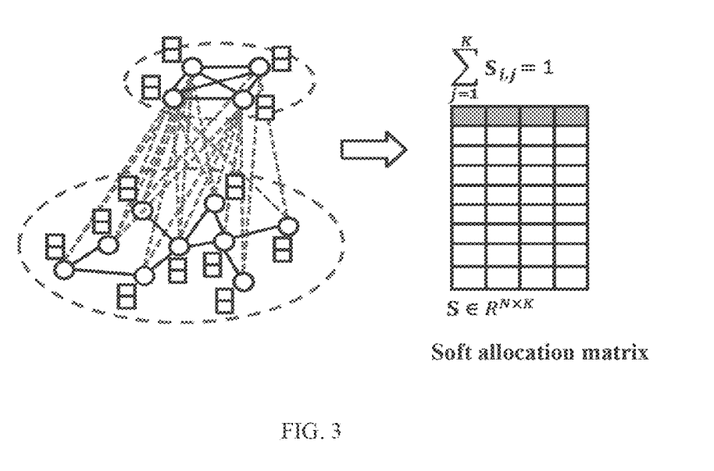
FIG. 3 illustrates a schematic diagram of a hierarchical graph neutral network structure and a soft allocation matrix according to the present application.

FIG. 3 illustrates a schematic diagram of a hierarchical graph neutral network structure and a soft allocation matrix according to the present application. As shown in FIG. 3, suppose that an upper layer has K potential junctions, a specific value of K may depend on actual needs, e.g., four as shown in FIG. 3. Each potential junction may have a corresponding physical meaning, and may be understood as a different parking lot type as a possible implementation mode, e.g., an office building parking lot, a shopping mall parking lot and so on. Then, as for any parking lot such as ** shopping mall parking lot, a probability that it belongs to different parking lot types may be obtained respectively in a conventional manner. If the probability that it belongs to a shopping center parking lot is the highest, the sum of the probabilities is 1.

Elements $S_i$; in the $i^{th}$ row in the soft allocation matrix may be calculated in the following manner, and the $i^{th}$ row represents any row in the soft allocation matrix:

$$S_i = \text{Softmax}(W_s x_i'); \quad (5)$$

where $x_i'$ represents the local space correlation information of the parking lot corresponding to the $i^{th}$ row at the current time, and $W_s$ represents a model parameter obtained by pre-training. The sum of the elements in the $i^{th}$ row is 1.

The representation vectors of the potential junctions may be determined respectively according to the soft allocation matrix.

The representation vector $x_i^s$ of any potential junction i in the K potential junctions may be expressed as:

$$x_i^s = \sum_{j=1}^{N} S_{i,j}^T x_j'; \qquad (6)$$

where N represents the number of parking lots in the parking lot association graph; $x_j'$ represents the local space correlation information of any parking lot j in the N parking lots at the current time; S represents the soft allocation matrix; T represents matrix transposition.

In addition, the weights of edges between the potential junctions may be determined respectively according to the soft allocation matrix and the parking lot association graph.

The weight $\alpha_{ij}^s$ of the edge between any two potential junctions i and j in the K potential junctions may be represented as:

$$\alpha_{ij}^s = \sum_{m=1}^{N} \sum_{n=1}^{N} S_{i,m}^T a_{mn} S_{n,j}; \qquad (7)$$

where N represents the number of parking lots in the parking lot association graph; S represents the soft allocation matrix; when any two parking lots m and n in the N parking lots are connected through an edge, $a^{mn}$ may be a first predetermined value, otherwise it may be a second predetermined value; e.g., the first predetermined value may be 1, and the second predetermined value may be 0; $S_{n,j}$ represents a value of an element at the $n^{th}$ row and the $j^{th}$ column in the soft allocation matrix, and so on so forth.

Furthermore, the final representation vectors of the potential junctions may be determined according to the representation vectors of the potential junctions and the weights of edges between the potential junctions, i.e., the final representation vectors of these potential junctions may be obtained by aggregating the potential junctions.

The final representation vector $x_i^{s'}$ of any potential junction i in the K potential junctions may be represented as:

$$x_i^{s'} = \sigma(\Sigma_{j \in Q_i} \alpha_{ij}^s W_l x_j^s) \qquad (8)$$

where $Q_i$ represents the number of potential junctions connected with the potential junction i through edges; $x_j^s$ represents the representation vector of any potential junction j of $Q_i$ neighboring potential junctions; $W_l$ represents a model parameter obtained by pre-training; $\alpha_{ij}^s$ represents a weight of the edge between the potential junction i and potential junction j; σ represents an activation function.

These potential junctions include different global information. The global information needed by the parking lots themselves may be obtained from the potential junctions through the soft allocation matrix. Specifically, as for any parking lot i, the global space correlation information of the parking lot i at the current time may be determined according to the final representation vectors of the potential junctions and the soft allocation matrix.

The global space correlation information $x_i^{sc}$ of the parking lot i at the current time may be represented as:

$$x_i^{sc} = \sum_{j=1}^{K} S_{i,j} x_j^{s'}; \qquad (9)$$

where $x_j^{s'}$ represents the final representation vector of any potential junction j in the K potential junctions; S represents the soft allocation matrix.

As for the parking lot i, the local space correlation information and global space correlation information of the parking lot i at the current time may be concatenated to obtain a concatenation result, i.e., obtain the final space correlation features simultaneously capturing the local space correlation information and global space correlation information. The concatenation may refer to connecting end to end.

The time correlation information of parking lot i at the current time may be determined according to the concatenation result, and the free parking space information at at least one future time step may be predicted according to the time correlation information of the parking lot i at the current time. As stated above, it is possible to determine the time correlation information of parking lot i at the current time based on a gated recurrent neural network model, and predict the free parking space information of the parking lot i at at least one future time step according to the time correlation information of the parking lot i at the current time. Preferably, the time correlation information of the parking lot i at the current time may be determined according to the concatenation result and output of the gated recurrent neural network model at a previous time, and in conjunction with the gated mechanism.

The time correlation information $h_i^t$ of the parking lot i at the current time may be:

$$h_i^t = (1 - z_i^t) \circ h_i^{t-1} + z_i^t \circ \tilde{h}_i^t; \qquad (10)$$

$$\text{where } z_i^t = \sigma(W_z[h_i^{t-1}, x_i''] + b_z); \qquad (11)$$

$$\tilde{h}_i^t = \tanh(W_{\tilde{h}}[r_i^t \circ h_i^{t-1}, x_i''] + b_{\tilde{h}}); \qquad (12)$$

$$r_i^t = \sigma(W_r[h_i^{t-1}, x_i''] + b_r); \qquad (13)$$

$W_z$, $W_{\tilde{h}}$, $W_r$, $b_z$, $b_{\tilde{h}}$ and $b_r$ all are model parameters obtained by pre-training; σ represents an activation function; $x_i''$ represents a concatenation result; $h_i^{t-1}$ represents the output of the gated recurrent neural network model at a previous time; ∘ represents a matrix multiplication.

As $x_i''$ includes the space correlation information at the current time, and $h_i^{t-1}$ includes spatiotemporal correlation information before time t, the obtained $h_i^t$ will simultaneously include the time correlation information and the space correlation information.

Furthermore, the free parking space information of the parking lot i at at least one future time step may be predicted using $h_i^t$, for example, the free parking space information of the parking lot i at future τ time steps may be predicted in the following manner:

$$(\hat{y}_i^{t+1}, \ldots, \hat{y}_i^{t+\tau}) = \sigma(W_o h_i^t) \qquad (14)$$

where τ is a positive integer greater than one, and its specific value may depends on actual needs; $h_i^t$ represents the time correlation information of the parking lot i at the current time; $W^o$ represents a model parameter obtained by pre-training, σ represents an activation function; $\hat{y}_i^{t+1}$ represents the predicted free parking space information of the parking lot i at a first future time step; $\hat{y}_i^{t+\tau}$ represents the predicted free parking space information of the parking lot i at $\tau^{th}$ future time step.

Suppose the value of $\tau$ is 3, the free parking space information of the parking lot i at the first future time step, the second future time step and the third future time step, respectively according to the Equation (14).

A time step for example may be 15 minutes. In practical application, for example, as for the parking lot i, prediction is performed one time every 15 minutes in the manner stated in the present embodiment, i.e., the free parking space information of the parking lot i at three future time steps may be predicted.

In addition, when the model is trained, $N_l$ parking lots with real-time sensors may be selected as sample parking lots, annotation data may be built based on historical free parking space information of the sample parking lots, training optimization may be performed based on the annotation data, and an objective function O is minimized.

The objective function $$O = \frac{1}{\tau N_l} \sum_{i=1}^{N_l} \sum_{j=1}^{\tau} (\hat{y}_i^{t+j} - y_i^{t+j})^2; \quad (15)$$

where $N_l$ is a positive integer greater than 1, and its specific value may depend on actual needs. $y_i^{t+j}$ represents real free parking space information of any sample parking lot i in $N_l$ sample parking lots at a corresponding time step.

The abovementioned model parameters may be learnt through model training. Specific implementation is of the prior art.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

To sum up, according to the solution of the method embodiment of the present application, the local space correlation information, the global space correlation information and the time correlation information of the parking lots may be determined in conjunction with the environment context features of the parking lots, and future free parking space information of the parking lots may be predicted based on these information, thereby improving the accuracy of the prediction result; in addition, the local space correlation information, the global space correlation information and the time correlation information of the parking lots may be obtained by virtue of different network models, thereby enhancing the accuracy of the obtained results and further enhancing the accuracy of subsequent prediction results; furthermore, when the model is trained, annotation data may be built based on historical free parking space information of the parking lots with real-time sensors, and training optimization may be performed, thereby making the annotation data more accurate and thereby enhancing the model training effect.

The above introduces the method embodiment. The solution of the present disclosure will be further described through an apparatus embodiment.

Figure 4:
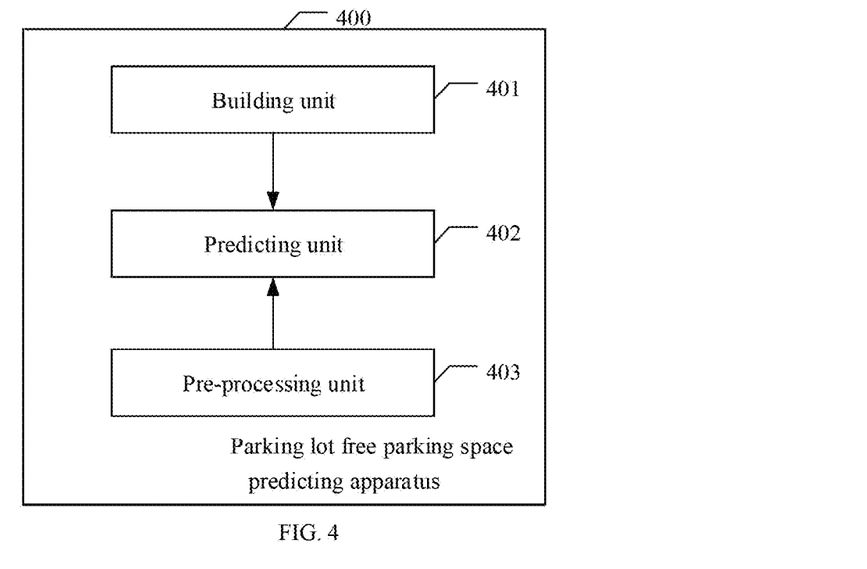
FIG. 4 illustrates a schematic structural diagram of a parking lot free parking space predicting apparatus 400 according to an embodiment of the present disclosure.

FIG. 4 illustrates a schematic structural diagram of a parking lot free parking space predicting apparatus 400 according to an embodiment of the present disclosure. As shown in FIG. 4, the apparatus comprises a building unit 401 and a predicting unit 402.

The building unit 401 is configured to build a parking lot association graph for parking lots in a region to be processed, each junction therein representing a parking lot, and any two parking lots meeting a predetermined condition being connected through edges.

The predicting unit 402 is configured to process as follows for any parking lot i: determine local space correlation information of parking lot i at a current time according to environment context features of the parking lot i and neighboring parking lots which are in the parking lot association graph and connected to the parking lot i through edges; determine global space correlation information of the parking lot i at the current time according to a soft allocation matrix built based on the local space correlation information of the parking lots at the current time; determine time correlation information of the parking lot i at the current time according to the local space correlation information and global space correlation information, and predict free parking space information of the parking lot i at at least one future time step according to the time correlation information of the parking lot i at the current time.

The building unit 401 may connect any two parking lots with a distance less than or equal to a predetermined threshold through edges.

In addition, the predicting unit 402 may determine local space correlation information of parking lot i at a current time based on a graph attention neutral network model, build the soft allocation matrix according to the local space correlation information of the parking lots at the current time based on a hierarchical graph neural network model, and determine the global space correlation information of the parking lot i at the current time according to the soft allocation matrix, and determine time correlation information of the parking lot i at the current time based on a gated recurrent neural network model, and predict the free parking space information of the parking lot i at at least one future time step according to the time correlation information of the parking lot i at the current time.

Specifically, the predicting unit 402 may, as for neighboring parking lots, determine weights of edges between the neighboring parking lots and the parking lot i at the current time according to the environment context features of the neighboring parking lots and parking lot i at the current time, respectively, aggregate the environment context features of the neighboring parking lots according to the weights of edges between the neighboring parking lots and the parking lot i to obtain a representation vector of the parking lot i, and regard the representation vector as the local space correlation information of the parking lot i at the current time.

A weight $\alpha_{ij}$ of the edge between any neighboring parking lot j and parking lot i is represented as $$\alpha_{ij} = \frac{\exp(c_{ij})}{\sum_{k \in N_i} \exp(c_{ik})}; \quad (2)$$

where $c_{ij}$=Attention($W_a x_i, W_a x_j$); \quad (3)

Attention represents a graph attention mechanism; $N_i$ represents the number of neighboring parking lots; $x_i$ represents the environment context feature of the parking lot i at the current time; $x_j$ represents the environment context feature of neighboring parking lot j at the current time; $W_a$ represents a model parameter obtained by pre-training.

The representation vector $x_i'$ may be represented as:

$$\sigma(\Sigma_{j \in N_i} \alpha_{ij} W_a x_j) \quad (4)$$

where $N_i$ represents the number of neighboring parking lots of the parking lot i; $x_j$ represents the environment context feature of any neighboring parking lot j among $N_i$ neighboring parking lots at the current time; $\alpha_{ij}$ represents a weight of the edge between the neighboring parking lot j and parking lot i at the current time; $W_a$ represents a model parameter obtained by pre-training; $\sigma$ represents an activation function.

The predicting unit 402 may further generate a N-row and K-column soft allocation matrix according to the local space correlation information of the parking lots at the current time, wherein N is equal to the number of parking lots in the parking lot association graph, K is equal to a preset number of potential junctions, each row in the soft allocation matrix corresponds to one parking lot, each column in the soft allocation matrix corresponds to a potential junction, each element in each row of the soft allocation matrix represents a probability that a corresponding parking lot belongs to a corresponding potential junction; according to the soft allocation matrix, determine representation vectors of the potential junctions respectively, and determine the weights of edges between the potential junctions respectively, connect any two potential junctions through edges, determine final representation vectors of the potential junctions according to the representation vectors of the potential junctions and the weights of edges between the potential junctions, and determine, as for the parking lot i, the global space correlation information of parking lot i at the current time respectively according to the final representation vectors of the potential junctions and the soft allocation matrix.

The predicting unit 402 may obtain elements in the $i^{th}$ row in the soft allocation matrix by calculating Softmax($W_s x_i'$), the $i^{th}$ row representing any row in the soft allocation matrix, $x_i'$ representing the local space correlation information of the parking lot corresponding to the $i^{th}$ row at the current time, and $W_s$ representing a model parameter obtained by pre-training.

The representation vector $x_i^s$ of any potential junction i in K potential junctions may be expressed as:

$$x_i^s = \sum_{j=1}^{N} S_{i,j}^T x_j'; \quad (6)$$

where N represents the number of parking lots in the parking lot association graph; $x_j'$ represents the local space correlation information of any parking lot j in the N parking lots at the current time; S represents the soft allocation matrix; T represents matrix transposition.

The weight $\alpha_{ij}^s$ of the edge between any two potential junctions i and j in the K potential junctions may be represented as:

$$\alpha_{ij}^s = \sum_{m=1}^{N} \sum_{n=1}^{N} S_{i,m}^T a_{mn} S_{n,j}; \quad (7)$$

where N represents the number of parking lots in the parking lot association graph; S represents the soft allocation matrix; when any two parking lots m and n in the N parking lots are connected through an edge, $a_{mn}$ is a first predetermined value, otherwise it is a second predetermined value; e.g., the first predetermined value may be 1, and the second predetermined value may be 0; $S_{n,j}$ represents a value of an element at the $n^{th}$ row and the $j^{th}$ column in the soft allocation matrix, and so on so forth.

The final representation vector $x_i^{s'}$ of any potential junction i in the K potential junctions may be represented as:

$$x_i^{s'} = \sigma(\Sigma_{j \in Q_i} \alpha_{ij}^s W_l x_j^s) \quad (8)$$

where $Q_i$ represents the number of potential junctions connected with the potential junction i through edges; $x_j^s$ represents the representation vector of any potential junction j of $Q_i$ neighboring potential junctions; $W_l$ represents a model parameter obtained by pre-training; $\alpha_{ij}^s$ represents a weight of the edge between the potential junction i and potential junction j; $\sigma$ represents an activation function.

The global space correlation information $x_i^{sc}$ of the parking lot i at the current time may be represented as:

$$x_i^{sc} = \sum_{j=1}^{K} S_{i,j} x_j^{s'}; \quad (9)$$

where $x_j^{s'}$ represents the final representation vector of any potential junction j in the K potential junctions; S represents the soft allocation matrix.

The predicting unit 402 may concatenate the local space correlation information and global space correlation information of the parking lot i at the current time to obtain a concatenation result, and determine the time correlation information of the parking lot i at the current time according to the concatenation result and output of the gated recurrent neural network model at a previous time.

The time correlation information $h_i^t$ of the parking lot i at the current time may be:

$$h_i^t = (1-z_i^t) \circ h_i^{t-1} + z_i^t \circ \tilde{h}_i^t; \quad (10)$$

where $z_i^t = \sigma(W_z[h_i^{t-1}, x_i''] + b_z); \quad (11)$ $\tilde{h}_i^t = \tanh(W_{\tilde{h}}[r_i^t \circ h_i^{t-1}, x_i''] + b_{\tilde{h}}); \quad (12)$ $r_i^t = \sigma(W_r[h_i^{t-1}, x_i''] + b_r); \quad (13)$ $W_z$, $W_{\tilde{h}}$, $W_r$, $b_z$, $b_{\tilde{h}}$ and $b_r$ all are model parameters obtained by pre-training; $\sigma$ represents an activation function; $x_i''$ represents a concatenation result; $h_i^{t-1}$ represents the output of the gated recurrent neural network model at a previous time; $\circ$ represents a matrix multiplication.

The predicting unit 402 may predict the free parking space information of the parking lot i at at least one future time step by using $h_i^t$, for example, predict the free parking space information of the parking lot i at future $\tau$ time steps in the following manner:

$$(\hat{y}_i^{t+1}, \ldots, \hat{y}_i^{t+\tau}) = \sigma(W_o h_i^t) \quad (14)$$

where $\tau$ is a positive integer greater than one, and its specific value may depends on actual needs; $h_i^t$ represents the time correlation information of the parking lot i at the current time; $W_o$ represents a model parameter obtained by pre-training, $\sigma$ represents an activation function; $\hat{y}_i^{t+1}$ represents the predicted free parking space information of the parking lot i at a first future time step; $\hat{y}_i^{t+\tau}$ represents the predicted free parking space information of the parking lot i at $\tau^{th}$ future time step.

In addition, the apparatus shown in FIG. 4 may further comprise: a pre-processing unit 403 configured to perform model training, where $N_l$ parking lots with real-time sensors may be selected as sample parking lots, annotation data may be built based on historical free parking space information of the sample parking lots, training optimization may be performed based on the annotation data, and an objective function O may be minimized;

where the objective function $$O = \frac{1}{\tau N_l}\sum_{i=1}^{N_l}\sum_{j=1}^{\tau}(\hat{y}_i^{t+j} - y_i^{t+j})^2; \quad (15)$$

where $N_l$ is a positive integer greater than 1, and its specific value may depend on actual needs. $y_i^{t+j}$ represents real free parking space information of any sample parking lot i at a corresponding time step.

A specific workflow of the apparatus embodiment shown in FIG. 4 will not be detailed any more here, and reference may be made to corresponding depictions in the above method embodiment.

To sum up, according to the solution of the apparatus embodiment of the present application, the local space correlation information, the global space correlation information and the time correlation information of the parking lots may be determined in conjunction with the environment context features of the parking lots, and future free parking space information of the parking lots may be predicted based on these information, thereby improving the accuracy of the prediction result; in addition, the local space correlation information, the global space correlation information and the time correlation information of the parking lots may be obtained by virtue of different network models, thereby enhancing the accuracy of the obtained results and further enhancing the accuracy of subsequent prediction results; furthermore, when the model is trained, annotation data may be built based on historical free parking space information of the parking lots with real-time sensors, and training optimization may be performed, thereby making the annotation data more accurate and thereby enhancing the model training effect.

According to embodiments of the present disclosure, the present disclosure further provides an electronic device and a readable storage medium.

Figure 5:
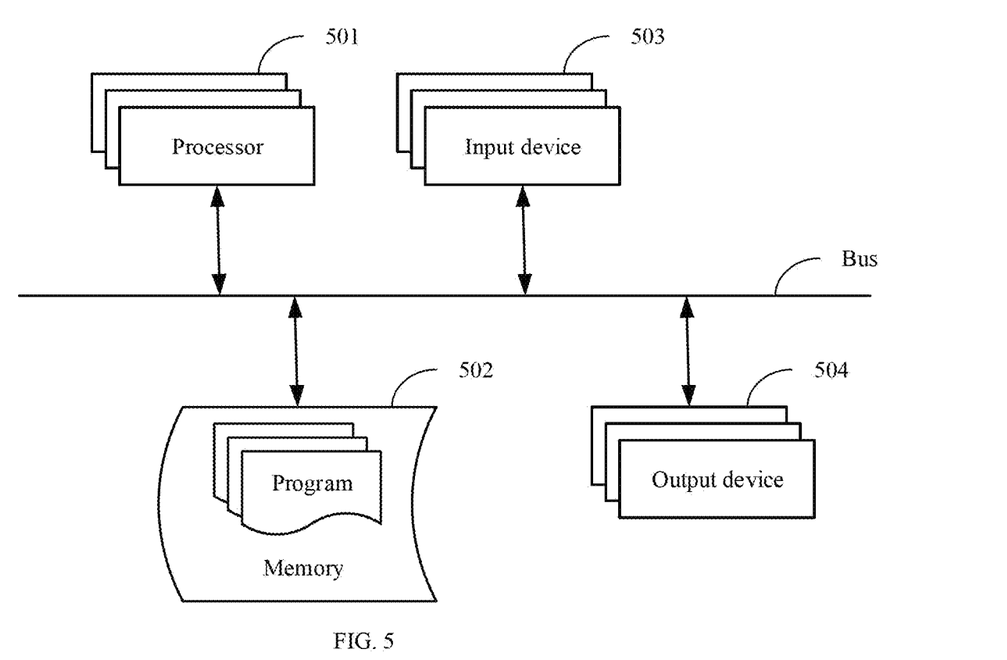
FIG. 5 illustrates a block diagram of an electronic device for implementing the method according to embodiments of the present disclosure.

As shown in FIG. 5, it shows a block diagram of an electronic device for the method according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 5, the electronic device comprises: one or more processors 501, a memory 502, and interfaces connected to components and including a high-speed interface and a low speed interface. Each of the components are interconnected using various busses, and may be mounted on a common motherboard or in other manners as appropriate. The processor can process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 501 is taken as an example in FIG. 5.

The memory 502 is a non-transitory computer-readable storage medium provided by the present disclosure. Wherein, the memory stores instructions executable by at least one processor, so that the at least one processor executes the method provided by the present disclosure. The non-transitory computer-readable storage medium of the present disclosure stores computer instructions, which are used to cause a computer to execute the method according to the present disclosure.

The memory 502 is a non-transitory computer-readable storage medium and can be used to store non-transitory software programs, non-transitory computer executable programs and modules, such as program instructions/modules corresponding to the method in embodiments of the present disclosure. The processor Y01 executes various functional applications and data processing of the server, i.e., implements the method in the above method embodiment, by running the non-transitory software programs, instructions and units stored in the memory 502.

The memory 502 may include a storage program region and a storage data region, wherein the storage program region may store an operating system and an application program needed by at least one function; the storage data region may store data created according to the use of the electronic device for implementing the video blending method according to the embodiment of the present disclosure. In addition, the memory 502 may include a high-speed random access memory, and may also include a non-transitory memory, such as at least one magnetic disk storage device, a flash memory device, or other non-transitory solid-state storage device. In some embodiments, the memory 502 may optionally include a memory remotely arranged relative to the processor 501, and these remote memories may be connected to the electronic device for implementing the video blending method according to embodiments of the present disclosure through a network. Examples of the above network include, but are not limited to, the Internet, an intranet, a local area network, a mobile communication network, and combinations thereof.

The electronic device for implementing the video blending method may further include an input device 503 and an output device 504. The processor 501, the memory 502, the input device 503 and the output device 504 may be connected through a bus or in other manners. In FIG. 5, the connection through the bus is taken as an example.

The input device 503 may receive inputted numeric or character information and generate key signal inputs related to user settings and function control of the electronic device for implementing the video blending method according to the embodiment of the present disclosure, and may be an input device such as a touch screen, keypad, mouse, trackpad, touchpad, pointing stick, one or more mouse buttons, trackball and joystick. The output device 504 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. 1s In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A computer-implemented parking lot free parking space predicting method, comprising:

building a parking lot association graph for parking lots in a region to be processed, each junction therein representing a parking lot, and connecting any two parking lots meeting a predetermined condition through edges;

aggregating, by at least one processor, environment context features of neighboring parking lots according to weights of edges between the neighboring parking lots and a parking lot i to obtain a representation vector of the parking lot i at a current time;

pre-training, by the at least one processor, a graph attention neural network model using the environment context features of the neighboring parking lots and free parking space information;

pre-training, by the at least one processor, a gated recurrent neural model according to the representation vector of the parking lot i at the current time;

for a parking lot, performing the following processing respectively:

determining, by the at least one processor, local space correlation information of parking lot i at the current time based on the graph attention neural network model according to environment context features of the parking lot i and neighboring parking lots which are in the parking lot association graph and connected to the parking lot i through edges;

determining, by the at least one processor, global space correlation information of the parking lot i at the current time according to a soft allocation matrix built based on the local space correlation information of the parking lots at the current time;

determining, by the at least one processor, time correlation information of the parking lot i at the current time based on the gated recurrent neural network model according to the local space correlation information and global space correlation information; and predicting, by the at least one processor, free parking space information of the parking lot i at at least one future time step according to the time correlation information of the parking lot i at the current time;

wherein the determining global space correlation information of the parking lot i at the current time according to a soft allocation matrix built based on the local space correlation information of the parking lots at the current time comprises: building the soft allocation matrix according to the local space correlation information of the parking lots at the current time based on a hierarchical graph neural network model, and determining the global space correlation information of the parking lot i at the current time according to the soft allocation matrix;

the determining time correlation information of the parking lot i at the current time and predicting free parking space information of the parking lot i at at least one future time step according to the time correlation information of the parking lot i at the current time comprises: determining time correlation information of the parking lot i at the current time based on the gated recurrent neural network model, and predicting the free parking space information of the parking lot i at at least one future time step according to the time correlation information of the parking lot i at the current time, determining local space correlation information of parking lot i at a current time based on a graph attention neural network model comprises:

for neighboring parking lots, determining weights of edges between the neighboring parking lots and the parking lot i at the current time according to the environment context features of the neighboring parking lots and parking lot i at the current time, respectively;

selecting the representation vector as the local space correlation information of the parking lot i at the current time, wherein a weight $\alpha_{ij}$ of the edge between any neighboring parking lot j and parking lot i is expressed as $$\alpha_{ij} = \frac{\exp(c_{ij})}{\sum_{k \in N_i} \exp(c_{ik})};$$

where $c_{ij}$=Attention($W_a x_i, W_a x_j$); Attention represents a graph attention mechanism; $N_i$ represents the number of neighboring parking lots; $x_i$ represents the environment context feature of the parking lot i at the current time; $x_j$ represents the environment context feature of neighboring parking lot j at the current time; $W_a$ represents a model parameter obtained by pre-training, or the representation vector $x_i' = \sigma(\Sigma_{j \in N_i} \alpha_{ij} W_a x_j)$;

where $N_i$ represents the number of neighboring parking lots; $x_j$ represents the environment context feature of any neighboring parking lot j among $N_i$ neighboring parking lots at the current time; $\alpha_{ij}$ represents a weight of the edge between the neighboring parking lot j and parking lot i at the current time; $W_a$ represents a model parameter obtained by pre-training; $\sigma$ represents an activation function, wherein the method further enhancing the accuracy of subsequent prediction results comprises:

training the graph attention neural network model and the gated recurrent neural network model by selecting $N_l$ parking lots with real-time sensors as sample parking lots, building annotation data based on historical free parking space information of the sample parking lots, performing training optimization based on the annotation data, and minimizing an objective function O;

where the objective function $$O = \frac{1}{\tau N_l} \sum_{i=1}^{N_l} \sum_{j=1}^{\tau} (\hat{y}_i^{t+j} - y_i^{t+j})^2,$$

$N_l$ is a positive integer greater than 1, and $y_i^{t+j}$ represents real free parking space information of any sample parking lot i at a corresponding time step.

2. The method according to claim 1, wherein the connecting any two parking lots meeting a predetermined condition through edges comprises: connecting any two parking lots with a distance less than or equal to a predetermined threshold through edges.

3. The method according to claim 1, wherein the building the soft allocation matrix according to the local space correlation information of the parking lots at the current time, and determining the global space correlation information of the parking lot i at the current time according to the soft allocation matrix comprises:

generating a N-row and K-column soft allocation matrix according to the local space correlation information of the parking lots at the current time, wherein the N is equal to the number of parking lots in the parking lot association graph, the K is equal to a preset number of potential junctions, each row in the soft allocation matrix corresponds to one parking lot, each column in the soft allocation matrix corresponds to a potential junction, each element in each row of the soft allocation matrix represents a probability that a corresponding parking lot belongs to a corresponding potential junction;

according to the soft allocation matrix, determining representation vectors of the potential junctions respectively, determining the weights of edges between the potential junctions respectively, and connecting any two potential junctions through edges;

determining final representation vectors of the potential junctions according to the representation vectors of the potential junctions and the weights of edges between the potential junctions;

determining, for the parking lot i, the global space correlation information of parking lot i at the current time according to the final representation vectors of the potential junctions and the soft allocation matrix.

4. The method according to claim 3, wherein the method further comprises: obtaining elements in the $i^{th}$ row in the soft allocation matrix by calculating Softmax($W_s x_i'$), the $i^{th}$ row representing any row in the soft allocation matrix, $x_i'$ representing the local space correlation information of the parking lot corresponding to the $i^{th}$ row at the current time, and $W_s$ representing a model parameter obtained by pre-training.

5. The method according to claim 3, wherein the representation vector $x_i^s$ of any potential junction i in K potential junctions is expressed as $$x_i^s = \sum_{j=1}^{N} S_{i,j}^T x_j';$$

where N represents the number of parking lots in the parking lot association graph; $x_j'$ represents the local space correlation information of any parking lot j in the N parking lots at the current time; S represents the soft allocation matrix.

6. The method according to claim 3, wherein the weight $\alpha_{ij}^s$ of the edge between any two potential junctions i and j in the K potential junctions is represented as $$\alpha_{ij}^s = \sum_{m=1}^{N} \sum_{n=1}^{N} S_{i,m}^T a_{mn} S_{n,j};$$

where N represents the number of parking lots in the parking lot association graph; S represents the soft allocation matrix; when any two parking lots m and n in the N parking lots are connected through an edge, $a_{mn}$ is a first predetermined value, otherwise it is a second predetermined value.

7. The method according to claim 3, wherein
the final representation vector $x_i^{s'}$ of any potential junction i in the K potential junctions is represented as: $x_i^{s'} = \sigma(\Sigma_{j \in Q_i} \alpha_{ij}^s W_l x_j^s)$;
where $Q_i$ represents the number of potential junctions connected with the potential junction i through edges; $x_j^s$ represents the representation vector of any potential junction j of $Q_i$ neighboring potential junctions; $W_l$ represents a model parameter obtained by pre-training; $\alpha_{ij}^s$ represents a weight of the edge between the potential junction i and potential junction j; $\sigma$ represents an activation function.

8. The method according to claim 3, wherein
the global space correlation information $x_i^{sc}$ of the parking lot i at the current time is represented as $$x_i^{sc} = \sum_{j=1}^{K} S_{i,j} x_j';$$

where $x_j^{s'}$ represents the final representation vector of any potential junction j in the K potential junctions; S represents the soft allocation matrix.

9. The method according to claim 1, wherein
before determining time correlation information of the parking lot i at the current time based on a gated recurrent neural network model, the method further comprises: concatenating the local space correlation information and global space correlation information of the parking lot i at the current time;
the determining time correlation information of the parking lot i at the current time based on a gated recurrent neural network model comprises: determining the time correlation information of the parking lot i at the current time according to the concatenation result and output of the gated recurrent neural network model at a previous time.

10. The method according to claim 9, wherein
the time correlation information $h_i^t$ of the parking lot i at the current time is represented as $h_i^t = (1 - z_i^t) \circ h_i^{t-1} + z_i^t \circ \tilde{h}_i^t$;

where $z_i^t = \sigma(W_z[h_i^{t-1}, x_i''] + b_z)$;

$\tilde{h}_i^t = \tanh(W_{\tilde{h}}[r_i^t \circ h_i^{t-1}, x_i''] + b_{\tilde{h}})$;

$r_i^t = \sigma(W_r[h_i^{t-1}, x_i''] + b_r)$;

$W_z$, $W_{\tilde{h}}$, $W_r$, $b_z$, $b_{\tilde{h}}$ and $b_r$ all are model parameters obtained by pre-training; $\sigma$ represents an activation function; $x_i''$ represents the concatenation result; $h_i^{t-1}$ represents the output of the gated recurrent neural network model at the previous time; and $\circ$ represents a matrix multiplication.

11. The method according to claim 1, wherein
the predicting the free parking space information of the parking lot i at at least one future time step according to the time correlation information of the parking lot i at the current time comprises:
predicting the free parking space information of the parking lot i at future $\tau$ time steps in the following manner: $(\hat{y}_i^{t+1}, \ldots, \hat{y}_i^{t+\tau}) = \sigma(W_o h_i^t)$;

where $\tau$ is a positive integer greater than one; $h_i^t$ represents the time correlation information of the parking lot i at the current time; $W_o$ represents a model parameter obtained by pre-training; $\sigma$ represents an activation function; $\hat{y}_i^{t+1}$ represents the predicted free parking space information of the parking lot i at a first future time step; $\hat{y}_i^{t+\tau}$ represents the predicted free parking space information of the parking lot i at $\tau^{th}$ future time step.

12. The method according to claim 11, wherein
the method further comprises:
when performing model training, selecting $N_l$ parking lots with real-time sensors as sample parking lots, building annotation data based on historical free parking space information of the sample parking lots, performing training optimization based on the annotation data, and minimizing an objective function O;
where the objective function $$O = \frac{1}{\tau N_l} \sum_{i=1}^{N_l} \sum_{j=1}^{\tau} (\hat{y}_i^{t+j} - y_i^{t+j})^2,$$

$N_l$ is a positive integer greater than 1, and $y_i^{t+j}$ represents real free parking space information of any sample parking lot i at a corresponding time step.

13. An electronic device, comprising
at least one processor; and
a memory communicatively connected with the at least one processor;
wherein the memory stores instructions executable by the at least one processor, and the instructions are executed by the at least one processor to enable the at least one processor to perform a parking lot free parking space predicting method, wherein the method comprises:
building a parking lot association graph for parking lots in a region to be processed, each junction therein representing a parking lot, and connecting any two parking lots meeting a predetermined condition through edges;
aggregating environment context features of neighboring parking lots according to weights of edges between the neighboring parking lots and a parking lot i to obtain a representation vector of the parking lot i at a current time;
pre-training a graph attention neural network model using the environment context features of the neighboring parking lots and free parking space information;
pre-training a gated recurrent neural model according to the representation vector of the parking lot i at the current time;
for a parking lot i, performing the following processing respectively:
determining local space correlation information of parking lot i at the current time based on the graph attention neural network model according to environment context features of the parking lot i and neighboring parking lots which are in the parking lot association graph and connected to the parking lot i through edges;
determining global space correlation information of the parking lot i at the current time according to a soft allocation matrix built based on the local space correlation information of the parking lots at the current time;
determining time correlation information of the parking lot i at the current time based on the gated recurrent neural network model according to the local space correlation information and global space correlation information; and
predicting free parking space information of the parking lot i at at least one future time step according to the time correlation information of the parking lot i at the current time;
wherein the determining global space correlation information of the parking lot i at the current time according to a soft allocation matrix built based on the local space correlation information of the parking lots at the current time comprises: building the soft allocation matrix according to the local space correlation information of the parking lots at the current time based on a hierarchical graph neural network model, and determining the global space correlation information of the parking lot i at the current time according to the soft allocation matrix;
the determining time correlation information of the parking lot i at the current time and predicting free parking space information of the parking lot i at at least one future time step according to the time correlation information of the parking lot i at the current time comprises: determining time correlation information of the parking lot i at the current time based on the gated recurrent neural network model, and predicting the free parking space information of the parking lot i at at least one future time step according to the time correlation information of the parking lot i at the current time,
determining local space correlation information of parking lot i at a current time based on a graph attention neural network model comprises:
for neighboring parking lots, determining weights of edges between the neighboring parking lots and the parking lot i at the current time according to the environment context features of the neighboring parking lots and parking lot i at the current time, respectively;
selecting the representation vector as the local space correlation information of the parking lot i at the current time,
wherein a weight $\alpha_{ij}$ of the edge between any neighboring parking lot j and parking lot i is expressed as $$\alpha_{ij} = \frac{\exp(c_{ij})}{\sum_{k \in N_i} \exp(c_{ik})};$$

where $c_{ij}$=Attention($W_a x_i, W_a x_j$); Attention represents a graph attention mechanism; $N_i$ represents the number of neighboring parking lots; $x_i$ represents the environment context feature of the parking lot i at the current time; $x_j$ represents the environment context feature of neighboring parking lot j at the current time; $W_a$ represents a model parameter obtained by pre-training, or
the representation vector $x_i' = (\Sigma_{j \in N_i} \alpha_{ij} W_a x_j)$;
where $N_i$ represents the number of neighboring parking lots; $x_j$ represents the environment context feature of any neighboring parking lot j among $N_i$ neighboring parking lots at the current time; $\alpha_{ij}$ represents a weight of the edge between the neighboring parking lot j and parking lot i at the current time; $W_a$ represents a model parameter obtained by pre-training; $\sigma$ represents an activation function, wherein the method further enhancing the accuracy of subsequent prediction results comprises:
training the graph attention neural network model and the gated recurrent neural network model by selecting $N_l$ parking lots with real-time sensors as sample parking lots, building annotation data based on historical free parking space information of the sample parking lots, performing training optimization based on the annotation data, and minimizing an objective function O;
where the objective function $$O = \frac{1}{\tau N_l} \sum_{i=1}^{N_l} \sum_{j=1}^{\tau} (\hat{y}_i^{t+j} - y_i^{t+j})^2,$$

$N_l$ is a positive integer greater than 1, and $y_i^{t+j}$ represents real free parking space information of any sample parking lot i at a corresponding time step.

14. The electronic device according to claim 13, wherein the connecting any two parking lots meeting a predetermined condition through edges comprises: connecting any two parking lots with a distance less than or equal to a predetermined threshold through edges.

15. A non-transitory computer-readable storage medium storing computer instructions therein, wherein the computer instructions are used to cause the computer to perform a parking lot free parking space predicting method, wherein the method comprises:
building a parking lot association graph for parking lots in a region to be processed, each junction therein representing a parking lot, and connecting any two parking lots meeting a predetermined condition through edges;
aggregating environment context features of neighboring parking lots according to weights of edges between the neighboring parking lots and a parking lot i to obtain a representation vector of the parking lot i at a current time;
pre-training a graph attention neural network model using the environment context features of the neighboring parking lots and free parking space information;
pre-training a gated recurrent neural model according to the representation vector of the parking lot i at the current time;
for a parking lot i, performing the following processing respectively:
determining local space correlation information of parking lot i at the current time based on the graph attention neural network model according to environment context features of the parking lot i and neighboring parking lots which are in the parking lot association graph and connected to the parking lot i through edges;
determining global space correlation information of the parking lot i at the current time according to a soft allocation matrix built based on the local space correlation information of the parking lots at the current time;
determining time correlation information of the parking lot i at the current time based on the gated recurrent neural network model according to the local space correlation information and global space correlation information, and
predicting free parking space information of the parking lot i at at least one future time step according to the time correlation information of the parking lot i at the current time;

wherein the determining global space correlation information of the parking lot i at the current time according to a soft allocation matrix built based on the local space correlation information of the parking lots at the current time comprises: building the soft allocation matrix according to the local space correlation information of the parking lots at the current time based on a hierarchical graph neural network model, and determining the global space correlation information of the parking lot i at the current time according to the soft allocation matrix;

the determining time correlation information of the parking lot i at the current time and predicting free parking space information of the parking lot i at at least one future time step according to the time correlation information of the parking lot i at the current time comprises: determining time correlation information of the parking lot i at the current time based on the gated recurrent neural network model, and predicting the free parking space information of the parking lot i at at least one future time step according to the time correlation information of the parking lot i at the current time, determining local space correlation information of parking lot i at a current time based on a graph attention neural network model comprises:

for neighboring parking lots, determining weights of edges between the neighboring parking lots and the parking lot i at the current time according to the environment context features of the neighboring parking lots and parking lot i at the current time, respectively;

selecting the representation vector as the local space correlation information of the parking lot i at the current time, wherein a weight $\alpha_{ij}$ of the edge between any neighboring parking lot j and parking lot i is expressed as $$\alpha_{ij} = \frac{\exp(c_{ij})}{\sum_{k \in N_i} \exp(c_{ik})};$$

where $c_{ij}$=Attention($W_a x_i, W_a x_j$); Attention represents a graph attention mechanism; $N_i$ represents the number of neighboring parking lots; $x_i$ represents the environment context feature of the parking lot i at the current time; $x_j$ represents the environment context feature of neighboring parking lot j at the current time; $W_a$ represents a model parameter obtained by pre-training, or the representation vector $x_i' = \sigma(\Sigma_{j \in N_i} \alpha_{ij} W_a x_j)$;

where $N_i$ represents the number of neighboring parking lots; $x_j$ represents the environment context feature of any neighboring parking lot j among $N_i$ neighboring parking lots at the current time; $\alpha_{ij}$ represents a weight of the edge between the neighboring parking lot j and parking lot i at the current time; $W_a$ represents a model parameter obtained by pre-training; $\sigma$ represents an activation function, wherein the method further enhancing the accuracy of subsequent prediction results comprises:

training the graph attention neural network model and the gated recurrent neural network model by selecting $N_I$ parking lots with real-time sensors as sample parking lots, building annotation data based on historical free parking space information of the sample parking lots, performing training optimization based on the annotation data, and minimizing an objective function O;

where the objective function $$O = \frac{1}{\tau N_I} \sum_{i=1}^{N_I} \sum_{j=1}^{\tau} (\hat{y}_i^{t+j} - y_i^{t+j})^2,$$

$N_I$ is a positive integer greater than 1, and $y_i^{t+j}$ represents real free parking space information of any sample parking lot i at a corresponding time step.

* * * * *